United States Patent [19]
Shirasaka

[11] Patent Number: 5,995,674
[45] Date of Patent: Nov. 30, 1999

[54] IMAGE PROCESSING APPARATUS WITH SHAPE-CORRECTION OF A CONTOUR-SPECIFIED FIGURE

[75] Inventor: Akifumi Shirasaka, Yokohama, Japan

[73] Assignee: Canon Kabushiki Kaisha, Tokyo, Japan

[21] Appl. No.: 08/261,203

[22] Filed: Jun. 15, 1994

Related U.S. Application Data

[63] Continuation of application No. 07/826,635, Jan. 23, 1992, abandoned, which is a continuation of application No. 07/426,868, Oct. 26, 1989, abandoned.

[30] Foreign Application Priority Data

Nov. 11, 1988 [JP] Japan ................................. 63-283871

[51] Int. Cl.$^6$ ........................................................ G06K 9/40
[52] U.S. Cl. ............................ 382/256; 382/258; 382/286
[58] Field of Search ................................. 382/44, 47, 60, 382/256, 258, 286, 298; 358/451; 395/133, 134, 140, 143; 356/384, 387

[56] References Cited

U.S. PATENT DOCUMENTS

| | | |
|---|---|---|
| Re. 30,679 | 7/1981 | Evans et al. .............................. 364/523 |
| 3,717,847 | 2/1973 | Kakuta ...................................... 382/60 |
| 4,117,517 | 9/1978 | Shitani ................................... 358/261.3 |
| 4,229,768 | 10/1980 | Kurahayashi et al. .................. 358/261 |
| 4,385,837 | 5/1983 | Schram ................................... 356/387 |
| 4,498,779 | 2/1985 | Southgate et al. ...................... 356/384 |
| 4,517,604 | 5/1985 | Lasher et al. ............................. 382/56 |
| 4,578,810 | 3/1986 | MacFarlane et al. ....................... 382/8 |
| 4,601,002 | 7/1986 | Rosenthal ................................ 395/143 |
| 4,620,287 | 10/1986 | Yam ........................................ 364/518 |
| 4,659,936 | 4/1987 | Kikkawa et al. ........................ 356/387 |
| 4,817,172 | 3/1989 | Cho ............................................ 382/21 |
| 4,819,185 | 4/1989 | Corona et al. .......................... 395/143 |
| 4,833,721 | 5/1989 | Okutomi et al. .......................... 382/21 |
| 4,837,847 | 6/1989 | Shirasaka et al. ......................... 382/55 |
| 4,843,629 | 6/1989 | Mischler et al. ............................ 382/6 |
| 4,847,785 | 7/1989 | Stephens ................................. 395/140 |
| 4,893,258 | 1/1990 | Sakuragi ................................. 382/298 |
| 4,933,865 | 6/1990 | Yamamoto .............................. 364/518 |
| 4,955,064 | 9/1990 | Shirasaka et al. ......................... 382/44 |
| 4,956,869 | 9/1990 | Migatake et al. ......................... 382/60 |

Primary Examiner—Matthew C. Bella
Attorney, Agent, or Firm—Fitzpatrick, Cella, Harper & Scinto

[57] ABSTRACT

An image processing apparatus which eliminates a deformation depending on the position of expansion which is produced when parallel contours within contour information are drawn on a bit plane.

12 Claims, 5 Drawing Sheets

IMAGE PROCESSING APPARATUS WITH SHAPE-CORRECTION OF A CONTOUR-SPECIFIED FIGURE

This application is a continuation of application Ser. No. 07/826,635, filed Jan. 23, 1992, now abandoned, which was a continuation of application Ser. No. 07/426,868, filed Oct. 26, 1989, now abandoned.

BACKGROUND OF THE INVENTION

1. Field of the Invention

This invention relates to an image processing apparatus, and more particularly, to an image processing apparatus for performing shape correction when displaying a figure the contour information of which is given.

2. Description of the Related Art

Heretofore, when drawing a figure according to contour information, there has been performed processing in which, if the contour information is represented by coordinate values including values under (to the right of) the decimal point, the contour information is drawn on a bit plane by converting the values into coordinate values represented by integer values on the bit plane by half-adjusting or truncating the non-integral values, and the inner portion of the contour is then painted in. Relative to difference in the position of expansion, it is possible to perform correction, such as adjusting the thickness from the center position, by adding control information indicating the framework position of the figure and the like.

In the above-described approach not using shape correction, however, there is the disadvantage that differences in width occur even for figures with contours having an identical shape according to the position of expansion. For example, for a figure in which relatively thin identical rectangles are arranged in parallel as shown in FIG. 3, an imbalance in shape is produced as shown in FIG. 4.

Furthermore, in shape correction processing performed by adding central information, such as framework information and the like, there is the disadvantage that such additional information is required besides the contour information. Hence, the amount of data to be held increases for a complicated figure, the work of preparing data increases greatly, and processing for reconstituting contour points according to the above-described information cannot easily be performed.

SUMMARY OF THE INVENTION

It is an object of the present invention to provide an image processing apparatus which removes the disadvantages in the approach as described above.

It is another object of the present invention to provide an image processing apparatus which removes change in shape depending on the position of expansion produced when drawing a pattern having at least a pair of parallel sides within contour information on a bit plane.

These and other objects are accomplished, according to one aspect of the present invention, by an image processing apparatus which comprises coordinate-information selection means for selecting contour-coordinate information for a figure having at least a pair of parallel sides from within contour information representing a contour constituting a figure, width calculation means for calculating a width between the parallel two sides according to the contour coordinate information selected by the coordinate information selection means, and drawing means for drawing the figure by the amount of the width calculated by the calculation means based on a predetermined side between the parallel two sides when drawing the figure on a bit plane.

DETAILED DESCRIPTION OF THE PREFERRED EMBODIMENT

The preferred embodiment of the present invention will now be explained with reference to the drawings. Although an explanation is provided in terms of a rectangle as a figure having at least a pair of parallel sides, the present invention is not limited thereto.

Figure 1:
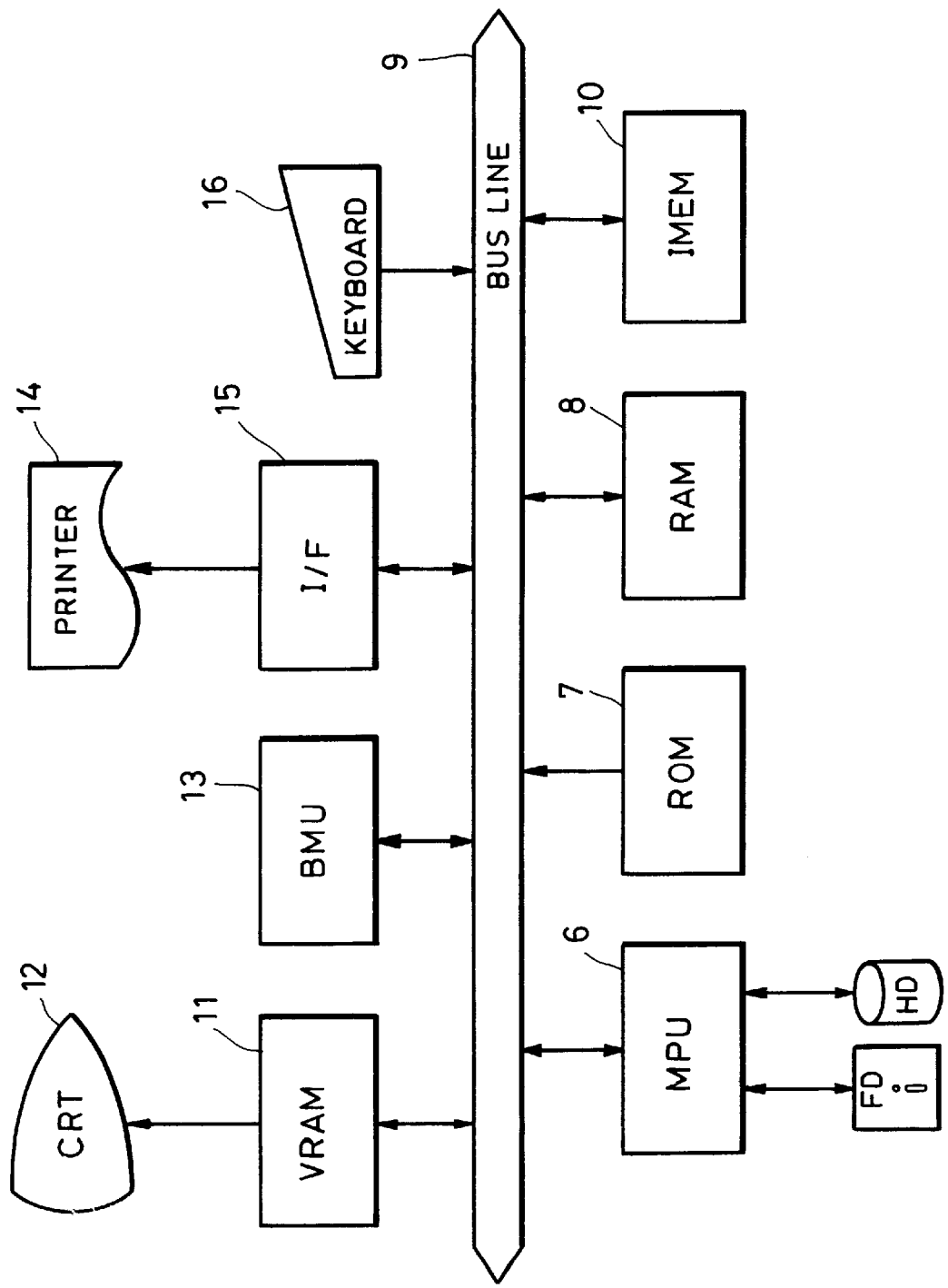
FIG. 1 is a block diagram showing the configuration of an image processing apparatus according to an embodiment of the present invention.
Figure 2A:
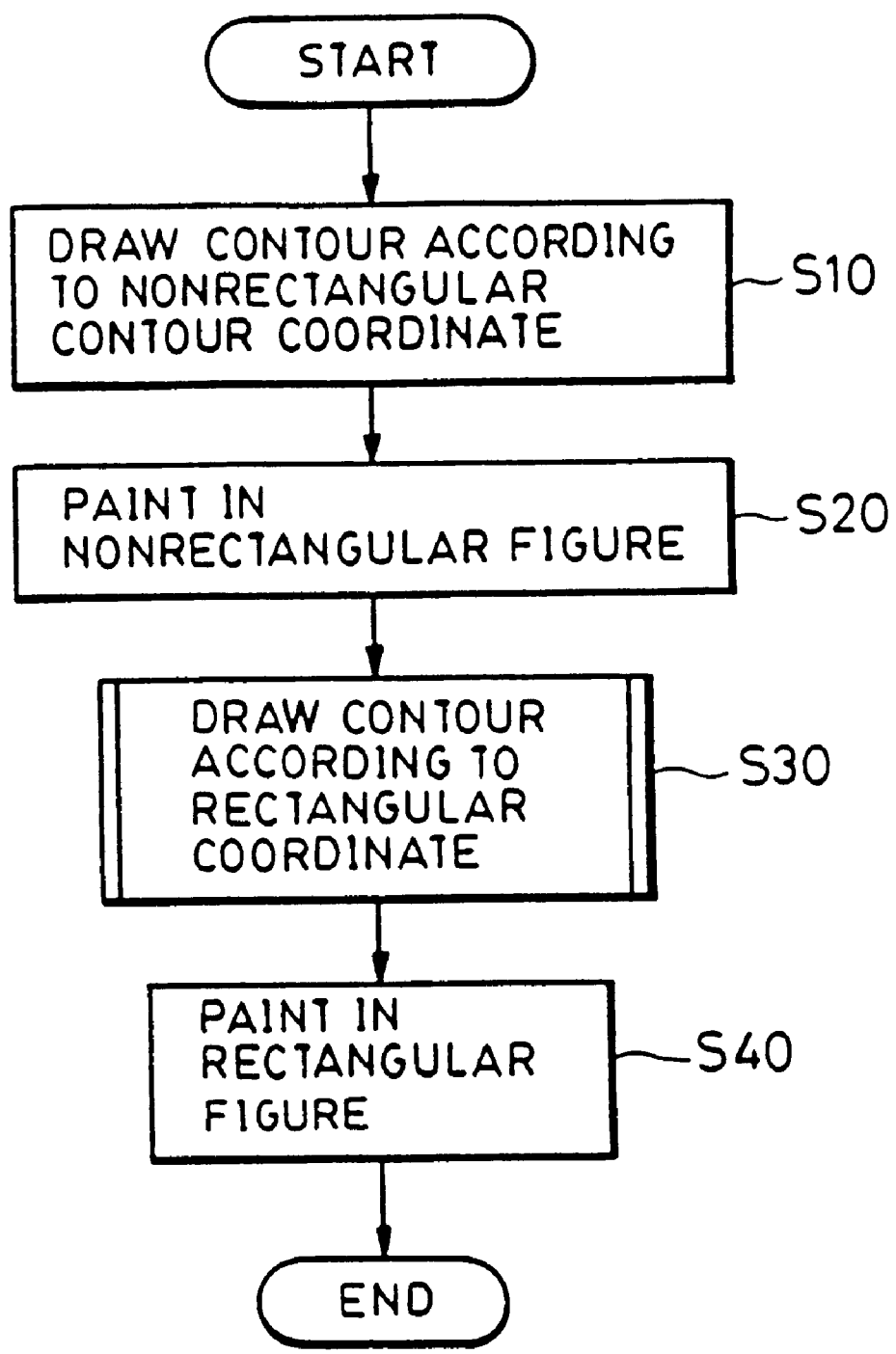
FIGS. 2A and 2B are flow charts showing procedures for drawing a contoured figure in the embodiment of FIG. 1.
Figure 2B:
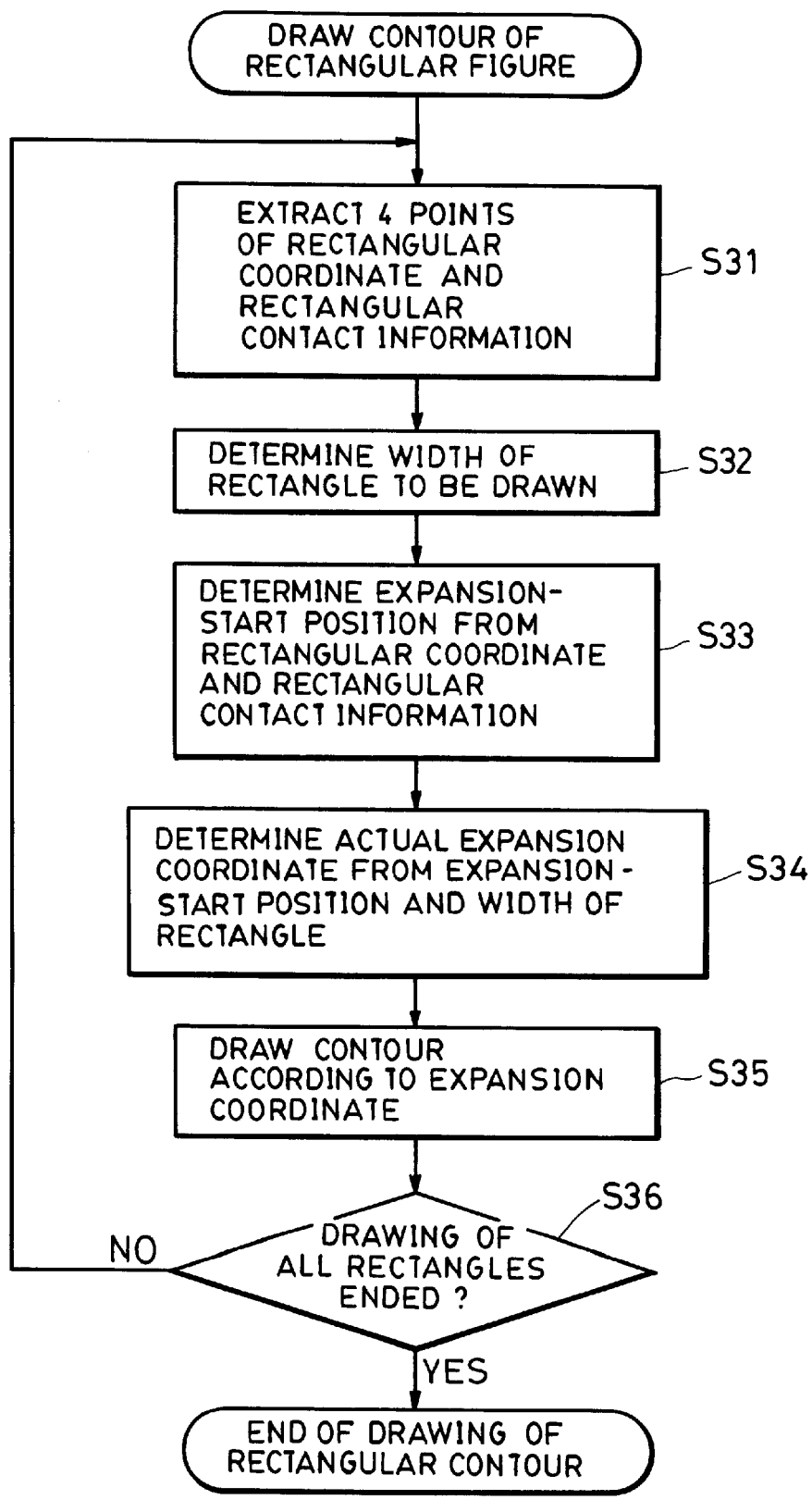
Figure 3:
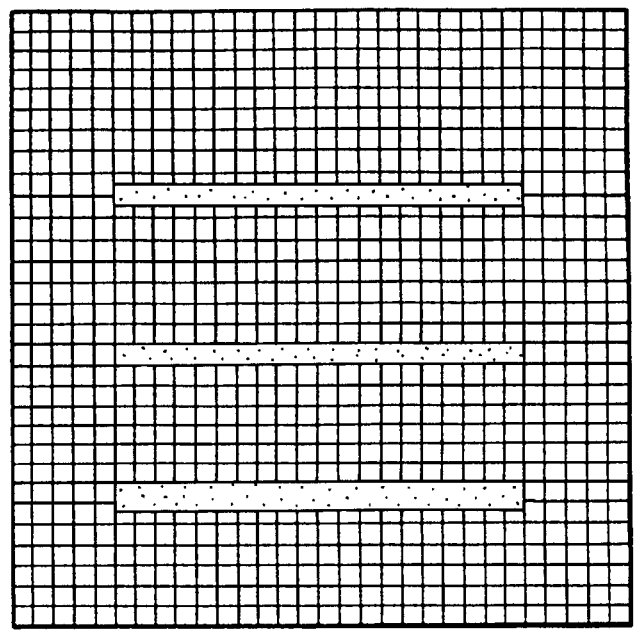
FIG. 3 is a diagram showing an original figure given by real-number values.
Figure 4:
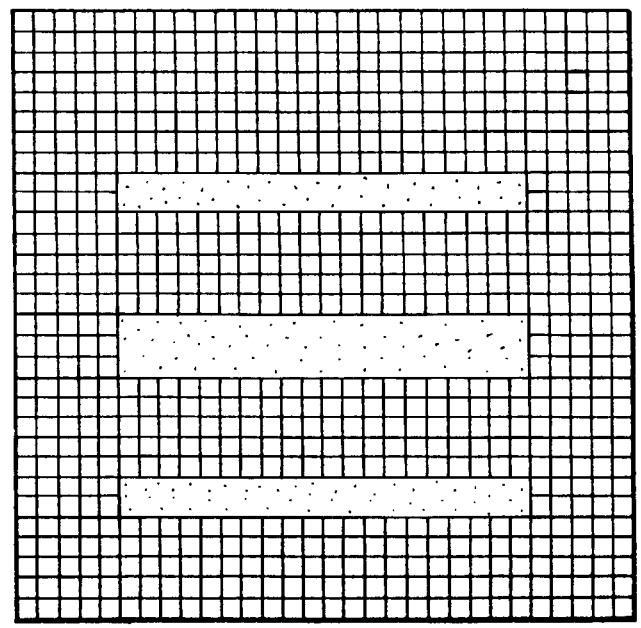
FIG. 4 is a diagram showing an example of expansion of the figure using the approach described above.

FIG. 1 is a diagram showing the configuration of an image processing apparatus according to the present invention. In FIG. 1, a main processing unit (termed hereinafter "MPU") 6 for controlling the entire image processing unit adjusts figure-expansion positions according to the flow charts of FIGS. 2A and 2B, which will be described later. To the MPU 6, external storage devices, such as floppy disks (FD), hard disks (HD) and the like, are connected. In a ROM 7, various kinds of control programs for the MPU 6 and adjustment programs for the figure-expansion positions shown in FIGS. 2A and 2B are stored. A RAM 8 temporarily stores letter data and various kinds of other data input from the outside via a bus line 9. An image memory (termed hereinafter "IMEM") 10 for storing image data can expand a bit plane, which will be described later, in the RAM 8 and the IMEM 10.

A video memory (termed hereinafter "VRAM") 11 expands data to be displayed on a CRT display unit 12 on a bit map. For letter data, for example, letter characters corresponding to the codes thereof are expanded on the VRAM 11, and it is possible to display the characters while directly generating a cursor on a display area of the VRAM 11 under the control of the MPU 6. A BMU (bit manipulation unit) 13 has a DMA function which can perform data transfer between input/output devices, such as the RAM 8, the VRAM 11, a printer and the like, without passing through the MPU 6. The apparatus also includes a printer 14, an interface 15 which connects the printer 14 to the bus line 9, and a keyboard 16 capable of inputting various kinds of data and commands.

Next, the method of an expansion-position adjustment processing in the image processing apparatus as configured above will be explained according to the flow charts shown in FIGS. 2A and 2B. In the present embodiment, the process of drawing a figure is separated into two stages, that is, drawing portions having nonrectangular contours and drawing portions having rectangular contours. Information representing nonrectangular contours, such as curve information, and information representing rectangular contours may previously have been separately stored, or may be selected before drawing processing. It is possible, for example, to separate curved portions and linear portions according to codes indicating the start of a curve or the end of a curve (CS, CE and the like). Furthermore, contact information with each side, which will be described later, may be easily discriminated according to code information representing a start point and an end point, such as LS, LE and the like, similarly to the CS, CE and the like.

The drawing of portions having nonrectangular contours is performed by a conventional method. First, given coordinate information (in real-number values) which of course, like all coordinate information, identifies a particular pixel (i.e., is defined to within an accuracy of less than one pixel of the bit plane), is converted into integer values by half-adjustment or truncation, and a contour is drawn on a bit plane according to the integer-valued coordinate information at step S10. The inner portion of the contour is then painted in at step S20.

Figure 5:
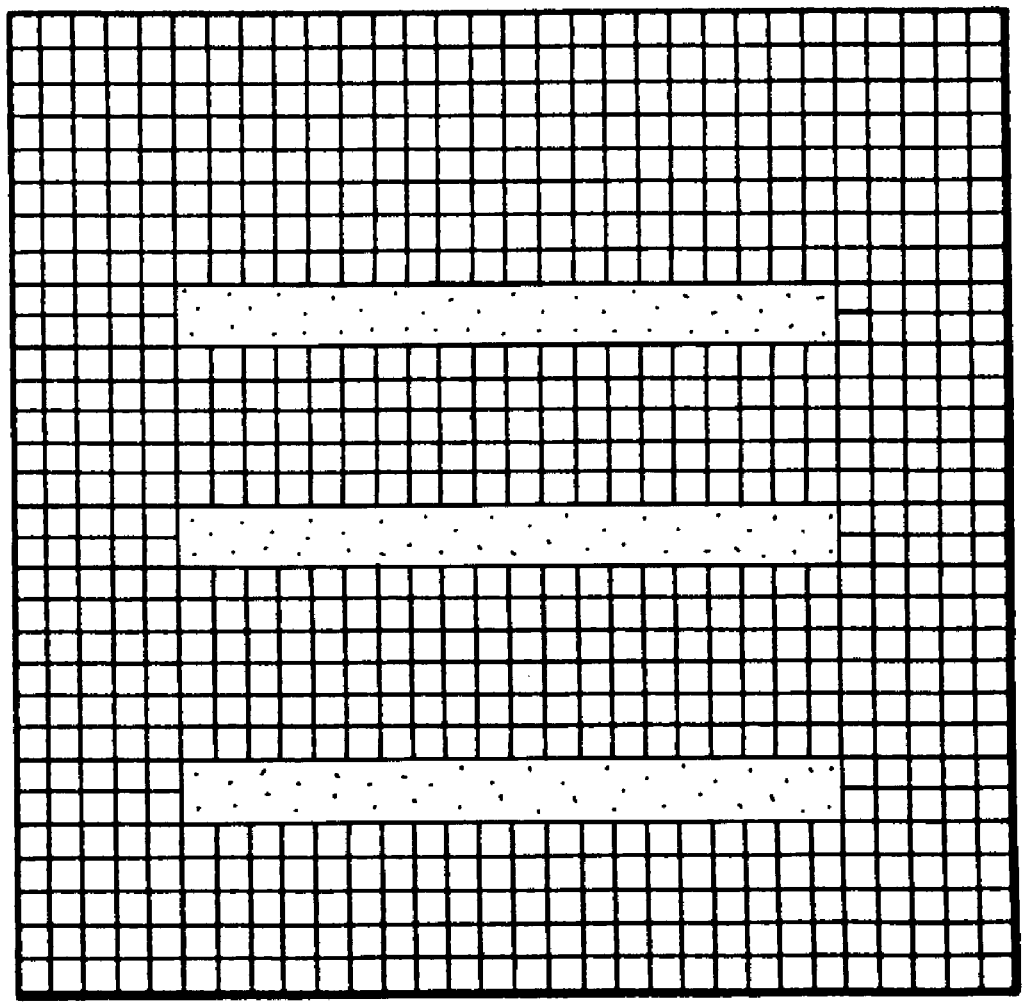
FIG. 5 is a diagram showing a figure drawn by the embodiment of FIG. 1.

In drawing rectangles at step S30, as shown in FIG. 2B in detail, when the contour information of a rectangular figure consists of real-number values of coordinates for 4 apex points (vertices) and contact information (i.e., information as to whether or not each of 4 sides contacts another figure), the 4 apex points and the contact information are first extracted at step S31. The width (thickness) of each rectangle is determined using integer numbers provided by a method, such as half-adjustment or the like, from the given information for the apexes at step S32. Subsequently, priority is given for sides having contact information. If there is no contact information, standard positions of expansion for apexes are provided in integer numbers in a predetermined order, and the other 3 apex points are also determined using the standard positions and the width (thickness) which has already been provided as an integer number at step S34. A contour is then actually drawn on the bit plane according to the determined coordinate values at step S35. This series of processing is repeated for each rectangle, returning for each from step S36 to step S31. An output as shown in FIG. 5 is obtained as a result of such adjustment processing of the position of expansion.

Subsequently, painting-in processing of the rectangular figures is performed at step S40.

As explained above, the present embodiment has the effect that the thickness of a portion having two parallel sides, which is important in the visual appearance of a figure, can easily be made uniform using contour information which has been prepared by a simple method.

Although, in the present embodiment, figures having rectangular contours and figures having nonrectangular contours are painted in after having been separately expanded, the expansion and painting-in may be executed mixed together.

Furthermore, as described at the beginning of the explanation of the preferred embodiment, it is apparent that the present invention may be applied not only to rectangles, but also to other figures having at least a pair of parallel sides.

According to the present invention, it is possible to provide an image processing apparatus which removes change in a figure depending on the position of expansion produced when drawing information of a figure having at least a pair of parallel sides within contour information.

What is claimed is:

1. Figure processing apparatus comprising:
   a first determining means for determining width information in integer form, based on a vertex coordinate representing an outline of the figure;
   a second determining means for determining other vertex coordinates based on a vertex coordinate which is a standard in the vertex coordinates representing the outline of said figure and width information determined by said first determining means;
   writing means for writing the outline of said figure based on the vertex coordinate which is the standard in the vertex coordinates representing the outline of said figure and the other vertex coordinates determined by said second determining means; and
   selecting means for selecting the vertex coordinate which is the standard in the vertex coordinates representing the outline of said figure based on contact information indicating whether each side of the outline of said figure contacts another figure or not.

2. Apparatus according to claim 1, wherein said selecting means selects the vertex coordinate of the side having said contact information in the, vertex coordinates of the outline of said figure.

3. Apparatus according to claim 1, further comprising output means for outputting the figure written by said writing means.

4. Apparatus according to claim 1, wherein said figure is a rectangle.

5. A method for processing a figure comprising the steps of:
   a first determining step of determining width information in integer form, based on vertex coordinates representing an outline of the figure;
   a second determining step of determining other vertex coordinates based on a vertex coordinate which is a standard in the vertex coordinates representing the outline of said figure and width information determined in said first determining step;
   writing the outline of said figure based on the vertex coordinate which is the standard in the vertex coordinates representing the outline of said figure and the other vertex coordinates determined in said second determining step; and
   selecting the vertex coordinate which is the standard in the vertex coordinates representing the outline of said figure based on contact information indicating whether each side of the outline of said figure contacts another figure or not.

6. A method according to claim 5, wherein said step of selecting selects the vertex coordinate of the side having said contact information in the vertex coordinates of the outline of said figure.

7. A method according to claim 5, further comprising the step of outputting the figure written by said writing step.

8. A method according to claim 5, wherein said figure is a rectangle.

9. A storage medium on which a program is stored for processing a figure, which program produces the steps of:
   a first determining step of determining width information in integer form, based on vertex coordinates representing an outline of the figure;
   a second determining step of determining other vertex coordinates based on a vertex coordinate which is a standard in the vertex coordinates representing the outline of said figure and width information determined in said first determining step;
   writing the outline of said figure based on the vertex coordinate which is the standard in the vertex coordinates representing the outline of said figure and the other vertex coordinates determined in said second determining step; and
   selecting the vertex coordinate which is the standard in the vertex coordinates representing the outline of said figure based on contact information indicating whether each side of the outline of said-figure contacts another figure or not.

10. A storage medium according to claim 9, wherein said step of selecting selects the vertex coordinate of the side having said contact information in the vertex coordinates of the outline of said figure.

11. A storage medium according to claim 9, wherein said program produces the further step of outputting the figure written by said writing step.

12. A storage medium according to claim 9, wherein said figure is a rectangle.

* * * * *

UNITED STATES PATENT AND TRADEMARK OFFICE
CERTIFICATE OF CORRECTION

PATENT NO.   : 5,995,674
DATED        : November 30, 1999
INVENTOR(S)  : AKIFUMI SHIRASAKA It is certified that error appears in the above-identified patent and that said Letters Patent is hereby corrected as shown below:

COLUMN 1:

Line 65, "contourco-" should read --contour-co---; and
    Line 66, "coordinateinformation" should read
         --coordinate-information--.

COLUMN 4:

Line 15, "the," should read --the--.

COLUMN 5:

Line 2,  "said-figure" should read --said figure--.

Signed and Sealed this

Sixth Day of February, 2001

Attest:

Q. TODD DICKINSON

*Attesting Officer*     *Director of Patents and Trademarks*